United States Patent [19]

Mortimer, Jr.

[11] Patent Number: 4,985,296
[45] Date of Patent: Jan. 15, 1991

[54] POLYTETRAFLUOROETHYLENE FILM

[75] Inventor: William P. Mortimer, Jr., New Castle, Del.

[73] Assignee: W. L. Gore & Associates, Inc., Newark, Del.

[21] Appl. No.: 324,166

[22] Filed: Mar. 16, 1989

[51] Int. Cl.⁵ .................. B32B 27/32; B20C 67/20; D02J 1/06
[52] U.S. Cl. .................. 428/220; 264/175; 264/288.8; 428/422
[58] Field of Search ............... 428/156, 422, 220, 323, 428/325, 328; 524/413, 435; 264/175, 288.8

[56] References Cited

U.S. PATENT DOCUMENTS 3,953,566  4/1976  Gore .
4,518,737  5/1985  Traut ........................... 524/435 X
4,609,584  9/1986  Culter et al. ...................... 428/156

FOREIGN PATENT DOCUMENTS 3433879  3/1986  Fed. Rep. of Germany .

Primary Examiner—Thomas J. Herbert
Attorney, Agent, or Firm—Gary A. Samuels

[57] ABSTRACT

A filled PTFE film is prepared by compressing an expanded, porous PTFE film that contains filler material. The films have high strength with substantially few pinholes.

16 Claims, 3 Drawing Sheets

POLYTETRAFLUOROETHYLENE FILM

FIELD OF THE INVENTION

This invention relates to very thin sheets of highly filled polytetrafluoroethylene; and to a process for making the sheets which comprises cocoagulating a PTFE aqueous dispersion containing filler particles, either calendering, or paste extruding and optionally calendering, stretching the film to form a porous filled film, and then compressing the film.

BACKGROUND OF THE INVENTION

Heretofore, it has been difficult to make very thin, i.e., less than 5 mils thick (0.005 inch) films that contain high amounts of filler material (over 25 volume %). As the filled films are calendered, the resultant movement of the filler particles past one another causes the film to tear or form pinholes, i.e. very small holes that cause electrical shorts when used as insulation. In addition, calendering may result in overworking the polytetrafluoroethylene, which tends to cause pinholes.

Highly filled films are desirable because of the wide range of uses for them. The uses will vary depending on how the particles affect the properties of the filled film. For example, a filler with a high dielectric constant can impart dielectric properties to a film that ordinarily would have a low dielectric constant. Reinforcing fillers can impart greater strength to base films. Still other fillers can impart thermal properties to films, and cause the film to act as a thermal sink. Other types of fillers can add electrically conductive properties or shielding properties to films.

Thus, fillers alter the characteristics of plastic films and enable the films to be used in applications they could not otherwise be used in. Very thin films are desirable, also, for applications where space volume or weight is important, as for example, in printed circuit boards where space reduction is desirable, or in electronic shielding applications, or in gaskets where weight and space reduction is important. Unfortunately, the thinner films become, the greater their susceptibility to tearing or forming pin holes due to the shifting and movement of the filler particles within the film caused by the forces on the film generated by the processing equipment.

It would be desirable to provide a process that minimizes the shifting and movement of the particles, and also allows very thin films to be prepared. It would also be desirable to provide thinner, more highly filled films than heretofore possible.

SUMMARY OF THE INVENTION

This invention comprises both a process and a product.

The process is a process for making a very thin, highly filled polytetrafluoroethylene film which comprises:
  (a) mixing 25-85 volume percent particulate filler of an average size of 40 micron or less with polytetrafluoroethylene in aqueous dispersion,
  (b) cocoagulating the filler and the polytetrafluoroethylene,
  (c) lubricating the filled polytetrafluoroethylene with lubricant,
  (d) (i) calendering or (ii) paste extruding and optionally calendering, to form a film,
  (e) expanding said film by stretching it so as to form a porous polytetrafluoroethylene having said filler distributed therein,
  (f) densifying the stretched material by compressing it until a desired thickness is obtained.

The product of this invention is a composition comprising a film of filled polytetrafluoroethylene that:
  (a) contains 25-85 volume percent particulate filler,
  (b) has a film thickness of between 0.1 and 5 mil, and
  (c) is substantially free of visual pinholes.

Polytetrafluoroethylene films with a thickness of only 0.1-5 mil that contain over 25% particulate filler and that are not torn or contain pinholes have not heretofore been known.

DESCRIPTION OF THE INVENTION

An important aspect of the process invention lies in the use of the unusual feature of polytetrafluoroethylene to expand on stretching to form a porous material of interconnected voids formed by nodes and fibrils. The stretching of polytetrafluoroethylene to form porous material is well known, being described in U.S. Pat. No. 3,543,566. The void space in expanded PTFE comprises at least 50% of the volume, and frequently more than 70%. Because of the expansion, the particulate filler particles are drawn apart from one another as the polytetrafluoroethylene is expanded. This reduces the opportunity for tears or pinholes to form as the polytetrafluoroethylene is compressed and results in a thin, highly filled film.

Figure 1:
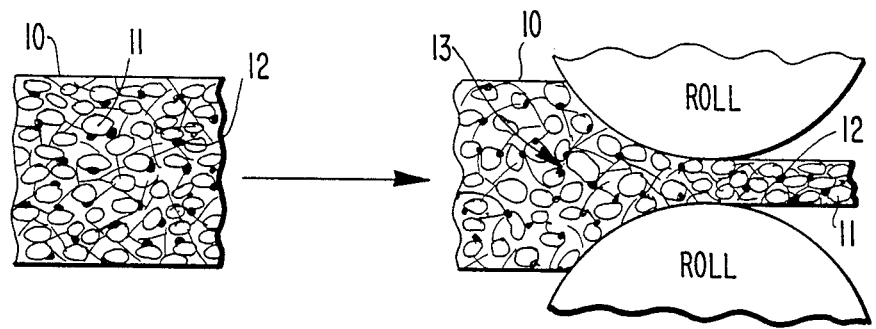
FIG. 1 is a depiction of how filler particulate in prior art films reacts to compaction by calendering to reduce film thickness.
Figure 2:
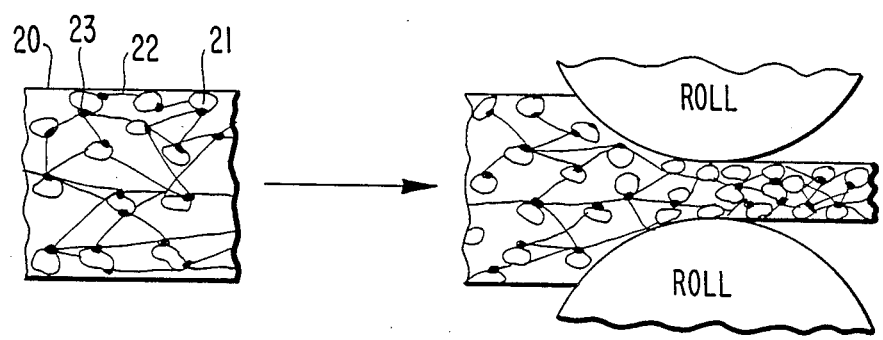
FIG. 2 is a depiction of the distribution of filler particulate in a stretched (or expanded) polytetrafluoroethylene to obtain a porous material having the filler particles distributed therein, followed by compaction.

This feature of the process invention can be described by reference to FIGS. 1 and 2. In FIG. 1, film 10 contains particulate filler 11 in part A, and PTFE 12. As calendering is carried out to reduce the thickness of film 10, as shown in Part B, the filler particulate 11 is moved and rearranged as shown by arrow 13, and flows past each other. This flowing and movement causes tears and pinholes in prior art films. FIG. 2 shows expanded or stretched PTFE film 20 containing nodes 21 (denoted by the irregular circles) interconnected with fibrils 22 (denoted by lines). Clustered around nodes 21 are particulate particles 23 (denoted by the solid black circles). The Figure also shows compaction.

To facilitate formation of the thin films of this invention, the particulate size of the fillers should average 40 microns or less. By "particulate" is meant individual particles of any aspect ratio and thus includes fibers and powders.

Figure 3:
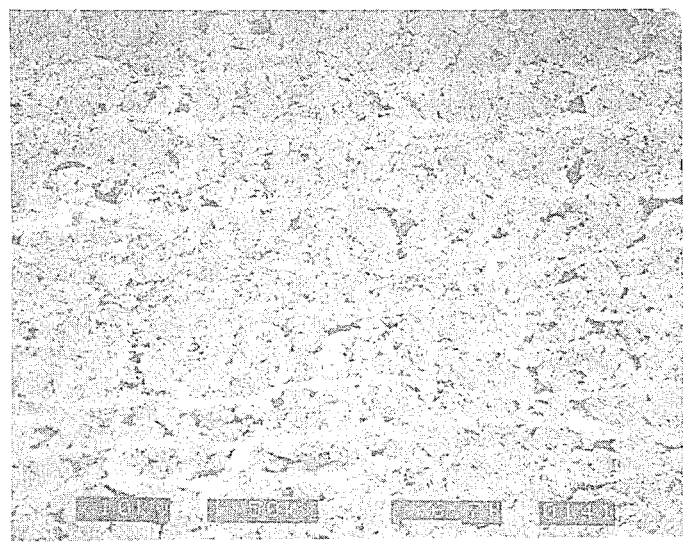
FIG. 3 is a photomicrograph of a filled film before expansion.
Figure 4:
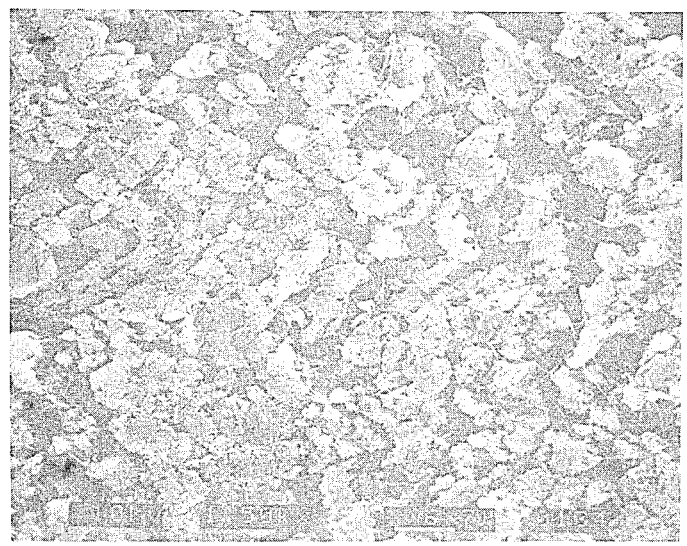
FIG. 4 is photomicrograph of the filled film of Example 1 after the film has been expanded, but before compression.

To prepare the filled films of this invention, particulate filler is mixed into an aqueous dispersion of dispersion-produced PTFE. The filler in small particle form is ordinarily less than 40 microns in size, and preferably has an average particulate size between 1 and 15 micron. The filler is introduced prior to co-coagulation in an amount that will provide 25 to 85, preferably 40 to 85, volume percent filler in the PTFE in relation to each other after the polytetrafluoroethylene is coagulated, expanded and densified. The filled PTFE dispersion is then cocoagulated, usually by rapid stirring. Coagulation can also be initiated by shearing, or by destabilizing with salt, acid, polyethyene imine, or the like. The coagulated filled PTFE is then dried. FIG. 3 is a photomicrograph of a coagulated PTFE filled with 28 volume % of carbon black filler magnified at 1500x magnification. The filled material is then lubricated with a common paste extrusion lubricant, such as mineral spirits or glycols, and then paste extruded. The extrudate is usually calendered, and then rapidly stretched to 1.20x to 5000x, preferably 2x to 100x, at a stretch rate of over 10% per second at a temperature of between 35° C. and 327° C. FIG. 4 is a photomicrograph of the same filled PTFE as in FIG. 3 after it has been expanded, at the same magnification. It is seen that the filler has been "pulled apart" and is clumped around nodes of the expanded PTFE. Thin fibrils linking the nodes are also seen. The lubricant can be removed from the extrudate prior to stretching, if desired.

Figure 5:
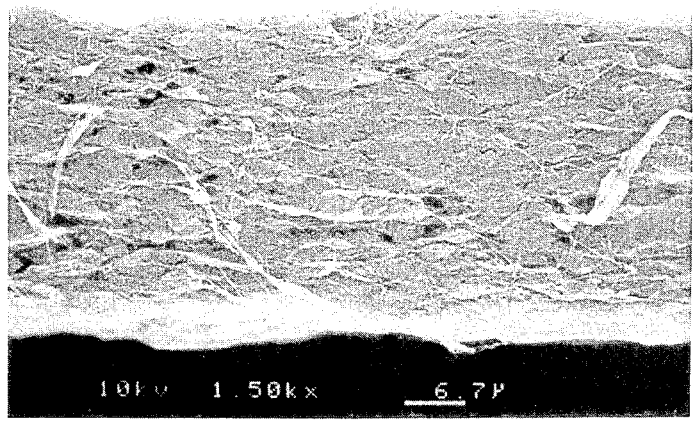
FIG. 5 is photomicrograph of the filled film after compression.

The resulting expanded, porous filled PTFE is then densified by subjecting it to pressure, such as by passing it between two adjacent nip rolls, or by vacuum compressing, or by compressing between two flat plates, whereupon the expanded film, which usually has a void volume in expanded unfilled form of more than 50 volume %, is compressed to reduce the void volume to less than about 25%. The thickness of the films is between 0.1 and 5 mils, preferably between 0.1 and 2 mil, most preferably between 0.2 and 1.5 mil. FIG. 5 is a photomicrograph of the same filled PTFE as in FIGS. 3 and 4 taken at the same magnification, except that it has been densified. Compression is evident, and it is seen that the surface of the densified material is unbroken.

The resulting filled PTFE film of this invention exhibits substantially no pinholes, as seen on visual inspection. In addition, as a result of the high strength inherent in porous expanded PTFE films, the densified compressed films of the invention also have high strength, as evidenced by an unsintered matrix tensile strength of at least 3500 psi, preferably 4000 psi, and most preferably over 5000 psi.

A number of particulate filler materials can be used herein. For example, because of the high void volume content, the dielectric constant of expanded porous PTFE is quite low, being on the order of 1.25 or so. However, by adding a filler material having a high dielectric constant, high dielectric properties can be imparted to films of expanded filled PTFE and to the densified films of this invention. Representative high dielectric fillers include titanium dioxide and barium titanate. Dielectrics of at least 7 or more can be obtained. Amounts of these high dielectric fillers present in the films will preferably be between 40–85 volume percent. Good capacitive properties are achieved because of the thinness of the film.

Other fillers impart other properties. For example, aluminum oxide fillers, present generally in amounts of 40–85 volume percent, make the expanded, filled and densified PTFE useful in thermal conductive applications such as electrically insulating heat sink gaskets.

Glass fiber or glass particles can be used to make expanded and densified PTFE more dimensionally stable. Loadings of up to 50 volume percent (preferably 10–40%) for fibers and 50–85 volume percent for particulate can be used and still possess good strength in the form of thin films. When fibers are used, aspect ratios of up to 50:1 are preferred.

Carbon black can be used as a filler to make electrically semi-conductive films, for wire and cable applications, such as electrodes, thin layer shielding and EMI gasketing. Amounts of 25–85 volume percent are preferred.

Other useful inorganic fillers include metal, semi-metals, ceramics, carbon/metal particulate-blends for gasket shielding, activated carbons, ceramics and the like. All are used in preferred amounts of 40–85 volume percent. Still other fillers include thermoplastic resins. Depending on end use, the thin films may be sintered. Other fillers may be used and the fillers are not limited to the ones described hereinabove.

Test Procedures:

Matrix tensile strength testing was carried out on an Instron Model 1122. Samples were one inch wide. Gauge length (distance between clamps) was two inches. Samples were pulled at a rate of 500% per minute. Matrix tensile stength is determined by the following equation:

$$MTS = \frac{423}{\substack{\text{gm/foot of} \\ \text{sample one} \\ \text{inch wide}}} \times \frac{\text{force at break (psi)}}{\substack{\text{weight fraction of} \\ \text{PTFE in sample}}}$$

EXAMPLE 1

A slurry of 1542 g. of Ketjenblack 300-J carbon black obtained from Noury Chemical and 52.35 . of deionized $H_2O$ was prepared in a 115 . container. While the slurry was agitated at 120 rpm, 4626 gm. PTFE in the form of a 10.2% solids polytetrafluoroethylene (PTFE) dispersion was rapidly poured into the mixing vessel. The PTFE dispersion was an aqueous dispersion obtained from ICI Americas Co. The mixture was self-coagulating and within 1.5 minutes co-coagulation was complete. After 10 minutes the coagulum had settled to the bottom of the mixing vessel and the water was clear.

The coagulum was dried at 160° C. in a convection oven. The material dried in small, cracked cakes approximately 2 cm. thick and was chilled to below 0° C. The chilled cake was hand ground using a tight, circular motion and minimal downward force through a 0.635 cm. mesh stainless steel screen, then 1.08 cc of mineral spirits per gram of powder was added. The mixture was chilled, again passed through a 0.635 cm. mesh screen, tumbled for 10 minutes, then allowed to sit at 18° C. for 48 hours and was retumbled for 10 minutes.

A pellet was formed in a cylinder by pulling a vacuum and pressing at 800 psi. The pellet was then heated in a sealed tube. The pellet was then extruded into tape form.

The tape was then calendered through heated rolls to 0.028 cm. The lubricant was then evaporated by running the tape across heated rolls. The tape was stretched in the machine direction twice; first at a 2 to 1 ratio, 240° C. and 32 m/min. output speed, and second at a 3 to 1 ratio, 240° C. and 29 m/min. output speed.

The expanded tape was then compressed to 0.003 cm by running it through heated rolls.

This process was also used to prepare compressed tapes containing carbon/nickel particles or carbon/nickel fibers in place of the carbon black of this example.

EXAMPLE 2

The process of Example 1 was followed except that:

The slurry used was 6,177 g Transelco electronic grade $TiO_2$ in 15 l of deionized $H_2O$, run through a colloid mill at 0.0025 cm. setting. 40.0 liters of $H_2O$ were then added to the slurry under agitation;

2523 gm. of PTFE was diluted with deionized $H_2O$ to 9.8% solids and was added to the agitated slurry;

0.265 cc polypropylene glycol were added per gram coagulum; The pellets were heated to 49° C., and ram extruded through a tapedic;

Four layers of extrudate were calendered together through heated rolls at a reduction of 25% per pass to 0.064 cm. The material was then stretched transversely 3.5 to 1 with the lubricant still present;

The lubricant was evaporated by running the tape across heated rolls;

The film was then stretched 5 to 1 transversely at 295° C. and 133%/sec;

The expanded filled film was then layed up 4 plies between copper foil and pressed at 225 psi in an autoclave at a temperature of 390° C. for 3 hrs then cooled under pressure;

This resulted in a copper laminate having a dielectric constant of 10 at 2.7 mil dielectric film thickness.

EXAMPLE 3

A slurry of 1,680 g of $Al_2O_3$ powder and 9,520 cc. of deionized $H_2O$ was prepared in a 19 liter container. While the slurry agitated at 225 rpm, 720 gm PTFE solids in a 15.0% solids PTFE dispersion was rapidly poured into it. After 1 minute, 21.6 g $Al(NO_3)_3$ in a 5.0% solution was added to initiate the co-coagulation. Within 30 seconds, the co-coagulation was complete. Within 10 minutes, the coagulum had settled to the bottom and the effluent was clear. Then, 0.276 cc mineral spirits/gram coagulum was added. The procedure then followed that of Example 1, except that:

an extrusion pressure of 850 psi was used;
calendering was to 0.028 cm.; and
tape was stretched at 3:1 ratio at 225° C. and 105 ft./min.
densification was to 0.0064 cm. thick.

EXAMPLE 4

The procedure of Example 1 was generally followed except:

The slurry was 4,330 g. tungsten powder and 10,100 cc. deionized $H_2O$;
The PTFE dispersion used was 30.0% solids;
Coagulation was initiated by adding 14.1 g. $Al(NO_3)_3$ in a 5.0% solution (like example 3);
Lubricant used was 0.166 cc. polypropylene glycol per gram of coagulum;
Pellet Temperature was 49° C.; Extrusion Pressure was 1450 psi;
Calendering was to 0.026 cm;
The tape was stretched at a 2:1 ratio at 275° C. and 120 ft/minute;
And densification was to 0.0086 cm.

EXAMPLE 5

The procedure of Example 1 was generally used except that 30 wt % PEEK, a thermoplastic resin (polyether ether ketone), powder were prepared as was done for carbon black in Example 1; coagulation was initiated with 48 g of $Al(NO_3)_3$ in a 5.0% solution; 0.254 cc mineral spirits/g. coagulum was added; pelletization dwell temperature 49° C.; extrusion pressure was 1,450 psi; Wet calendered with lubricant to 0.033 cm thickness; stretching was at 3-1 and 2-1, 100 ft/min., and 270° C.; and densification was to 0.0076 cm.

The properties of the Examples are set forth in Table I. By passing the product through a light box and visually inspecting the product as it passes through the box, flaws can be observed. No flaws were observed in the products of the Examples.

TABLE I

|  | EXAMPLE 1 | EXAMPLE 2 | EXAMPLE 4 | EXAMPLE 5 |
| --- | --- | --- | --- | --- |
| Vol. % filler | 28 | 56 | 50 | 41.5 |
| Thickness (cm) | .003 | .007* | .009 | .008 |
| Wt./Area (g/m2) | 36.9 | 230 | 659 | 134 |
| MTS - machine direction (psi) | 16,245 | 7,862 | 4,300 | 6,825 |
| MTS - non-machine direction (psi) | 554 | 8,106 | 530 | 902 |

*Sample measured had 4 plies of filled film produced.

I claim:

1. A thin film of filled polytetrafluoroethylene that:
   (a) contains 25-85 volume percent particulate filler,
   (b) has a film thickness of between 0.1 and 5 mil, and
   (c) is substantially free of visual pinholes.
2. The thin film of claim 1 wherein the film has an unsintered matrix tensile strength of at least 3500 psi.
3. The film of claim 1 wherein the thickness of the film is between 0.1 and 2 mil.
4. The film of claim 1 wherein the thickness of the film is between 0.2 and 1.5 mil.
5. The film of claim 1, 2, 3 or 4 wherein the filler is selected from the class consisting of titanium dioxide, barium titanate, aluminum oxide, glass fiber, glass particulate, carbon black, carbon/metal particulate, activated carbon, ceramic particulate, and polyether ether ketone; and the filler content is at least 40% by volume based on total volume of film excluding any void space.
6. A film of claim 1, 2, 3 or 4 wherein the filler is of high dielectric.
7. A film of claim 1 wherein the dielectric constant of the film is greater than 7.
8. A film of claim 1 wherein the filler is a fiber having an aspect ratio of 3:1 or greater.
9. A film of claim 1 wherein the filler is titanium dioxide present in an amount of 40-85 volume percent.
10. A film of claim 1 wherein the filler is barium titanate present in an amount of 40-85 percent.
11. A film of claim 1 wherein the filler is glass fiber present in an amount of 10-40 percent.
12. A film of claim 1 wherein the filler is glass particulate in an amount of 30-85 volume percent.

13. A film of claim 1 wherein the filler is aluminum oxide in an amount of 40–85 volume percent.

14. A film of claim 1 wherein the filler is carbon black in an amount of 40–85 volume percent.

15. A film of claim 1 wherein the filler is polyether ether ketone in an amount of 25–85 volume percent.

16. Process comprising:
   (a) mixing 25–85 volume percent particulate filler of an average size of 40 micron or less with polytetrafluoroethylene in aqueous dispersion,
   (b) cocoagulating the filler and the polytetrafluoroethylene,
   (c) lubricating the filled polytetrafluoroethylene with lubricant,
   (d) (i) calendering or (ii) paste extruding and optionally calendering, to form a film,
   (e) expanding said film by stretching it so as to form an expanded porous polytetrafluoroethylene having said filler distributed therein,
   (f) densifying the stretched material by compressing it until a desired thickness is obtained.

* * * * *